(12) United States Patent
Hodgson et al.

(10) Patent No.: US 9,240,663 B2
(45) Date of Patent: Jan. 19, 2016

(54) TUNABLE FEMTOSECOND LASER-PULSE SOURCE INCLUDING A SUPER-CONTINUUM GENERATOR

(71) Applicant: Coherent, Inc., Santa Clara, CA (US)

(72) Inventors: Norman Hodgson, Belmont, CA (US); Dmitri Simanovski, Palo Alto, CA (US); Andrei Starodoumov, Campbell, CA (US)

(73) Assignee: Coherent, Inc., Santa Clara, CA (US)

( * ) Notice: Subject to any disclaimer, the term of this patent is extended or adjusted under 35 U.S.C. 154(b) by 45 days.

(21) Appl. No.: 14/080,366

(22) Filed: Nov. 14, 2013

(65) Prior Publication Data

US 2015/0131143 A1    May 14, 2015

(51) Int. Cl.
*G02B 6/00* (2006.01)
*G02F 1/35* (2006.01)
*H01S 3/00* (2006.01)

(52) U.S. Cl.
CPC ............... *H01S 3/0092* (2013.01); *G02F 1/35* (2013.01); *G02F 2001/3528* (2013.01); *G02F 2001/3542* (2013.01)

(58) Field of Classification Search
CPC ............... G02B 6/00; G02B 6/12; G02B 1/35
USPC ...................................... 385/36, 31
See application file for complete search history.

(56) References Cited

U.S. PATENT DOCUMENTS

| | | | |
|---|---|---|---|
| 6,081,379 A * | 6/2000 | Austin et al. | 359/584 |
| 6,154,318 A | 11/2000 | Austin et al. | |
| 7,630,418 B2 | 12/2009 | Franjic et al. | |
| 8,498,046 B2 * | 7/2013 | Dong et al. | 359/341.5 |
| 2005/0220154 A1 * | 10/2005 | Uemura et al. | 372/18 |
| 2007/0263681 A1 * | 11/2007 | Yoshitomi et al. | 372/25 |
| 2008/0013587 A1 * | 1/2008 | Tempea et al. | 372/93 |
| 2008/0049301 A1 * | 2/2008 | Krausz et al. | 359/326 |
| 2010/0020387 A1 * | 1/2010 | Wise et al. | 359/326 |

OTHER PUBLICATIONS

Liao et al., "Ultrabroad Supercontinuum Generation through Filamentation in Tellurite Glass", Laser Physics Letters, vol. 10, 2013, pp. 1-5.
Yuejiang et al., "More than 120nm Enhanced Supercontinuum Generation in the Dispersionshifted Fiber with a Double-Pass Configuration", Proceedings of SPIE, vol. 5623, 2005, pp. 388-391.
Zhang et al., "Fiber-Optical Wavelength Conversion Based on Double-Pass Supercontinuum Generation" Microwave and Optical Technology Letters, vol. 50, No. 8, Aug. 2008, pp. 1987-1989.

* cited by examiner

*Primary Examiner* — Kaveh C Kianni
(74) *Attorney, Agent, or Firm* — Morrison & Foerster LLP (57) ABSTRACT

A mode-locked fiber MOPA delivers pulses of laser-radiation. A super-continuum generator including a bulk spectral-broadening element and a negative group-delay dispersion (NGDD) device is arranged to receive a pulse from the MOPA and cause the pulse to make a predetermined number of sequential interactions with the broadening element and the NGDD device. After making the predetermined interactions, the pulse is delivered from the super-continuum generator with a very broad spectral-bandwidth and a very short duration.

18 Claims, 11 Drawing Sheets

TUNABLE FEMTOSECOND LASER-PULSE SOURCE INCLUDING A SUPER-CONTINUUM GENERATOR

TECHNICAL FIELD OF THE INVENTION

The present invention relates in general to super-continuum generation by spectral broadening of ultra-short laser-radiation pulses. The invention relates in particular to spectral broadening of the ultra-short radiation pulses in bulk nonlinear material.

DISCUSSION OF BACKGROUND ART

In a coherent super-continuum source, ultra short laser radiation pulses having relatively high peak power are typically spectrally broadened by passing the pulses through a short optical fiber which is either tapered to less than single mode dimensions or through a structured optical fiber such as a photonic crystal fiber (PCF), with the PCF being preferred. Typical sources of the laser-radiation pulses are mode-locked titanium sapphire (Ti:sapphire) lasers or Yb-doped mode-locked fiber lasers, both having pulse durations between tens of femtoseconds (fs) and hundreds of fs.

In order to maintain a phase correlation across the broadened spectrum, the typical length of a structured fiber is short, for example between about 5 millimeters (mm) and 10 mm. Depending on a particular application, the spectrally broadened pulses may be used with the entire broadened spectrum, or parts of the broadened spectrum may be tunable selected by a spectrometer or an interference filter. Applications of super-continuum sources include microscopy, spectroscopy and ultrafast amplifier seeding and phase stabilization.

A problem with using tapered or structured fibers for spectral broadening, while maintaining optical coherence across the spectrum, is that a relatively small core-diameter or about 5 micrometers ($\mu$m) or less is required. This leads to a poor coupling efficiency into the fiber, for example about 50% or less. In addition, the relatively small core-diameter limits the pulse-energy that can be broadened to about 5 to 10 nanojoules (nJ). At higher energy, damage to the fiber can occur.

Super-continua can also be generated by spectrally broadening ultra-short laser-radiation pulses by focusing the laser-radiation pulses in a bulk optical element of a highly nonlinear material such as Tellurite glass. Such a bulk element is significantly less expensive than a PCF and allows broadening the spectrum of high energy pulses with pulse energies of mJ and more. However, in order to overcome a problem of short interaction length of the focused pulses (resulting from a short Rayleigh range of the focused pulses) in the broadening element, the pulse-energy must be increased to a level where self-focusing effects create what is known as an elongated "filament" of different refractive index in the element. This filament behaves as a waveguide induced in the broadening element, which extends the interaction length of the pulse with the material of the broadening-element.

Filamentation, however, can cause permanent photo modification of the material of the broadening element, if not actual optical damage. This means that the broadening element would need to be periodically "shifted" with respect to a focused beam to expose an undamaged portion of the element to the beam. This would prolong the useful lifetime of the element. Eventually, however, the element would need to be replaced. There is a need for a method of spectral broadening in a bulk nonlinear element that is effective without a need for filamentation.

SUMMARY OF THE INVENTION

In one aspect, an apparatus in accordance with the present invention comprises a source of pulses of laser-radiation, each pulse having a first pulse-duration and a first pulse-spectrum. The apparatus includes a spectral broadener. The spectral broadener includes a bulk spectral-broadening element and a negative group-delay dispersion device. The spectral broadener is arranged to receive a pulse from the source of laser pulses, cause the pulse to make a predetermined number of sequential interactions with the spectral-broadening element and the negative group-delay dispersion (NGDD) device, and deliver the pulse with a second pulse-duration and a second pulse-spectrum, the second pulse-duration being shorter than the first pulse-duration and the second pulse-spectrum being broader than the first pulse-spectrum.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
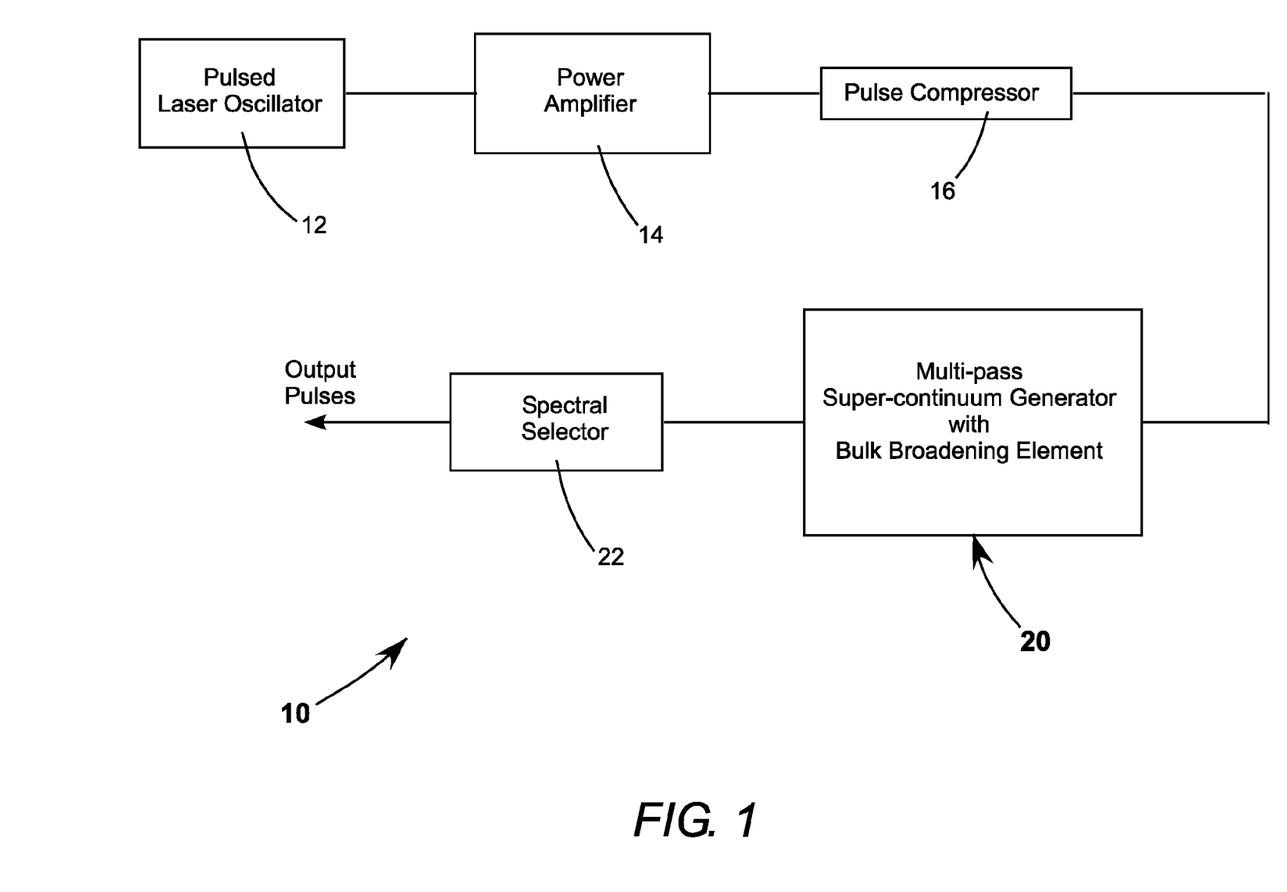
FIG. 1 schematically illustrates a preferred embodiment of a tunable femtosecond laser-pulse source in accordance with the present invention including a pulsed laser-oscillator, a power amplifier for amplifying pulses from the laser oscillator, a pulse compressor for temporally compressing the amplified pulses, and a multi-pass super-continuum generator including a bulk spectral-broadening element.

Referring now to the drawings, wherein like components are designated by like reference numerals, FIG. 1 schematically illustrates a preferred embodiment 10 of a tunable femtosecond laser-pulse source in accordance with the present invention. Source 10 includes a pulsed laser-oscillator 12, a power amplifier 14 for amplifying pulses from the laser oscillator, and a pulse compressor 16 for temporally compressing the amplified pulses. The pulse-compressor can include gratings or prisms as is known in the art. The temporally-compressed, amplified pulses are spectrally broadened in multi-pass super-continuum generator 20 in accordance with the present invention. A spectral selector 22, such as a grating or prism spectrometer, selects one or more wavelength bands of the spectrally broadened pulses to provide output pulses.

Figure 2:
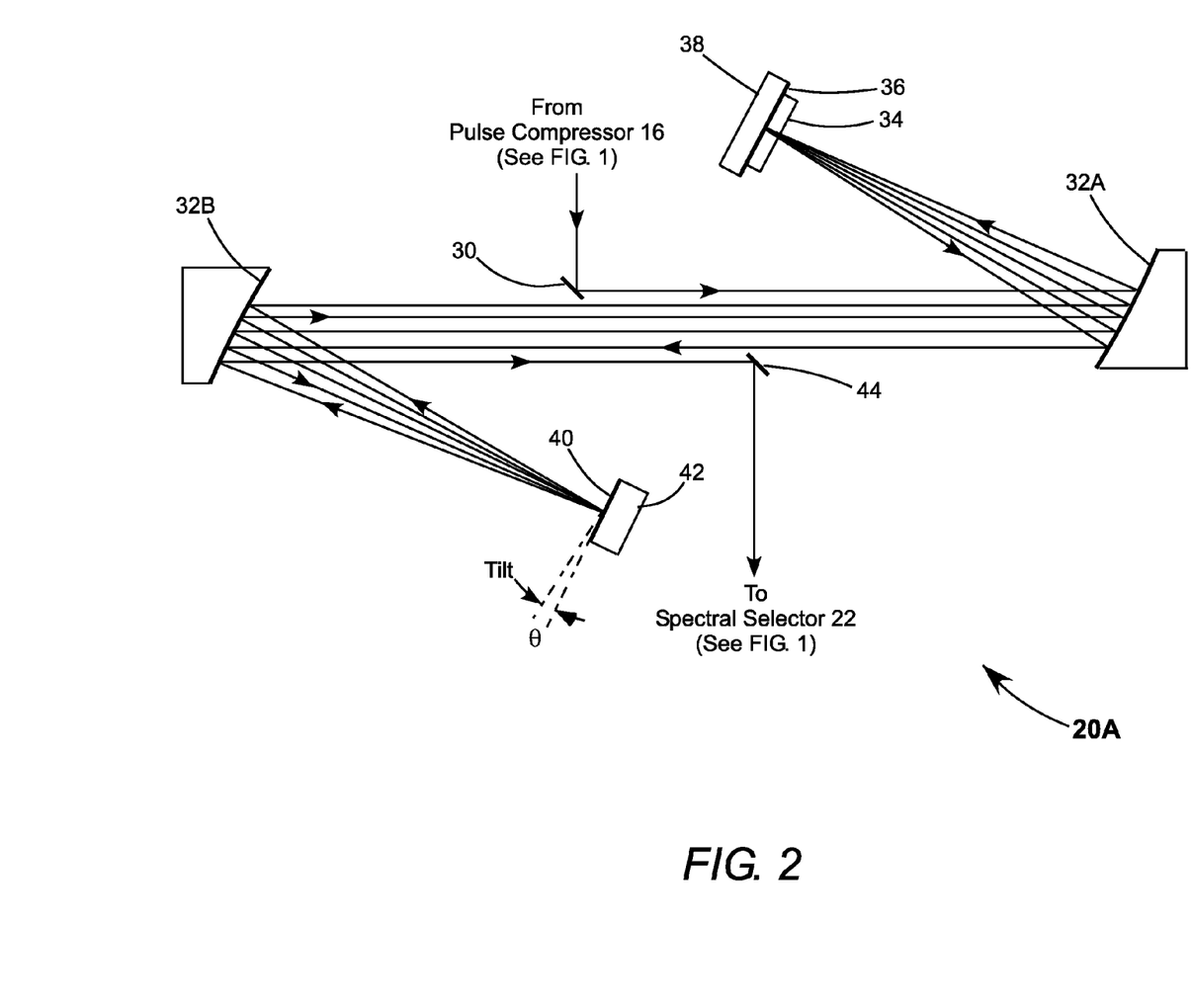
FIG. 2 schematically illustrates one preferred embodiment of the super-continuum generator of FIG. 1, including a multi-pass optical relay formed between a first plane mirror surmounted by a bulk spectral-broadening element, and a second plane mirror having a negative group-delay dispersion (NGDD) minor coating thereon for providing pulse re-compression.

It is assumed for purposes of this description that laser-oscillator 12 is a mode-locked fiber-laser delivering pulses at a wavelength of 1040 nanometers (nm) having a duration of about 100 femtoseconds (fs) and a spectral bandwidth of about 11 nm, at a PRF of 80 Megahertz (MHz), with an average power of 2 milliwatts, (mW). The power amplifier includes plural stages of fiber (optical) amplification, with the pulses being stretched to 100 ps duration prior to at least the final stage of amplification. Pulse compressor 16 compresses the amplified, stretched pulses back to 100 fs duration. Compressed amplified pulses from pulse-compressor 16 are assumed to have an average power of about twenty Watts (20 W) and a spectral bandwidth (FWHM) of about 20 nm. FIG. 2 schematically illustrates one preferred embodiment 20A of super-continuum generator (spectral broadener) 20 of FIG. 1. Super-continuum generator 20A includes a multi-pass optical relay formed between a first plane mirror 36 surmounted by a bulk spectral-broadening element 34, and a second plane minor comprising a negative group-delay dispersion (NGDD) mirror coating 40 on a substrate 42. A detailed description of the design and properties of NGDD minors is presented in U.S. Pats. No. 6,081,379, and 6,154,318, assigned to the assignee of the present invention and the complete description of which is hereby incorporated by reference. NGDD minors are sometimes referred to by a questionable terminology "chirped minors". Mirror 36 is backed by a substrate 38 which can be optionally cooled.

Mirrors 36 and 40 are at the foci of off-axis parabolic mirrors 32A and 32B respectively. The spectral-broadening element may be made from tellurium oxide (TeO$_2$), tellurite glass, sapphire (Al$_2$O$_3$), zinc sulfide (ZnS), and silicon carbide (SiC), among other optically nonlinear materials.

A pulse from compressor 16 to be spectrally broadened is directed by a turning minor 30 to parabolic mirror 32A. Mirror 32A focuses the pulse (assumed to be collimated) through spectral-broadening element 34 onto mirror 36. Mirror 36 reflects the pulse back through the optically nonlinear element back onto mirror 32A. Such a double pass through broadening element 34 is referred to hereinafter a "bounce". The spectral-broadening element is preferably only about thick enough to accommodate one half of the Rayleigh range of the focused beam inside the material. For the pulse parameters exemplified above and ZnS as the nonlinear material, a thickness of less than 1 mm is preferred More preferably the thickness is between about 150 μm and 300 μm. After the bounce off the spectral-broadening element 34, the pulse is spectrally broadened to a certain extent, and temporally stretched by positive dispersion introduced by the broadening element.

Mirror 32B re-collimates the pulse and directs the re-collimated pulse to mirror 32B which focuses the pulse on NGDD minor 40. Mirror 40 temporally re-compresses the pulse. Mirror 40 may only provide partial compression or even over-compression to have a pulse with negative frequency chirp incident on the nonlinear material on the next bounce. Here it should be noted that the term re-compression as used herein means canceling positive GDD introduced by the broadening element by NGDD introduced by a NGDD device. This re-compression may be complete re-compression, i.e., with the NGDD equal to the positive GDD; partial-recompression with less NGDD than positive GDD; or over re-compression with more NGDD than positive GDD. This is discussed in detail, with examples, further hereinbelow.

Continuing with reference to FIG. 2, NGDD minor 40 is tilted at an angle with respect to mirror 36 such that a pulse returned to mirror 32B returns to mirror 32A along a path spaced apart from the previous incidence path. A result of this is that the pulse follows multiple parallel paths between mirrors 32A and 32B, and makes corresponding multiple bounces from the spectral-broadening element and multiple reflections from the NGDD mirror. Eventually one of the parallel paths is intercepted by a turning minor 44 which directs the pulse out of the super-continuum generator to the spectral selector of FIG. 1. As depicted in FIG. 2, the pulse makes 5 bounces from the element 34 and 5 reflections from NGDD minor 40. Those skilled in the art will recognize that such a multi-pass relay arrangement can be made to provide more than 5, or less than 5 bounces by suitable placement of the turning mirrors.

Figure 3:
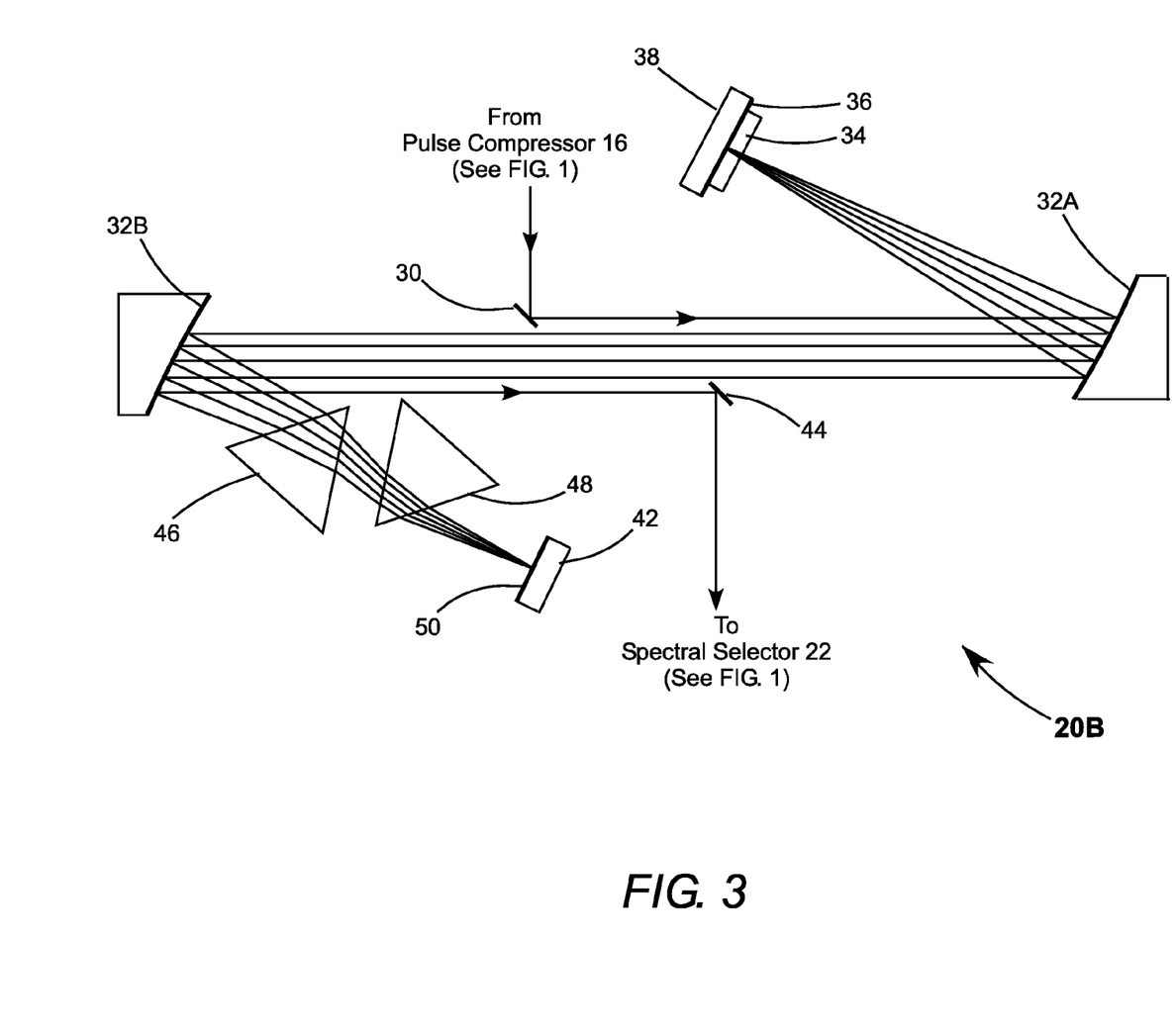
FIG. 3 schematically illustrates another preferred embodiment of the super-continuum generator of FIG. 1, similar to the super-continuum generator of FIG. 2, but wherein the second plane mirror has a conventional reflective coating and pulse-recompression is provided by a pair of prisms.

FIG. 3 schematically illustrates another preferred embodiment 20B of the super-continuum generator of FIG. 1, similar to the super-continuum generator of FIG. 2 with an exception that pulse re-compression is provided by prisms 46 and 48 arranged as a complementary prism pair. The NGDD mirror coating 40 of super-continuum generator 20A is replaced in generator 20B by a conventional reflective coating 50. After each bounce from spectral-broadening element 34, the pulse is further spectrally broadened, and after pass through the prisms, the pulse is further temporally compressed.

Figure 4:
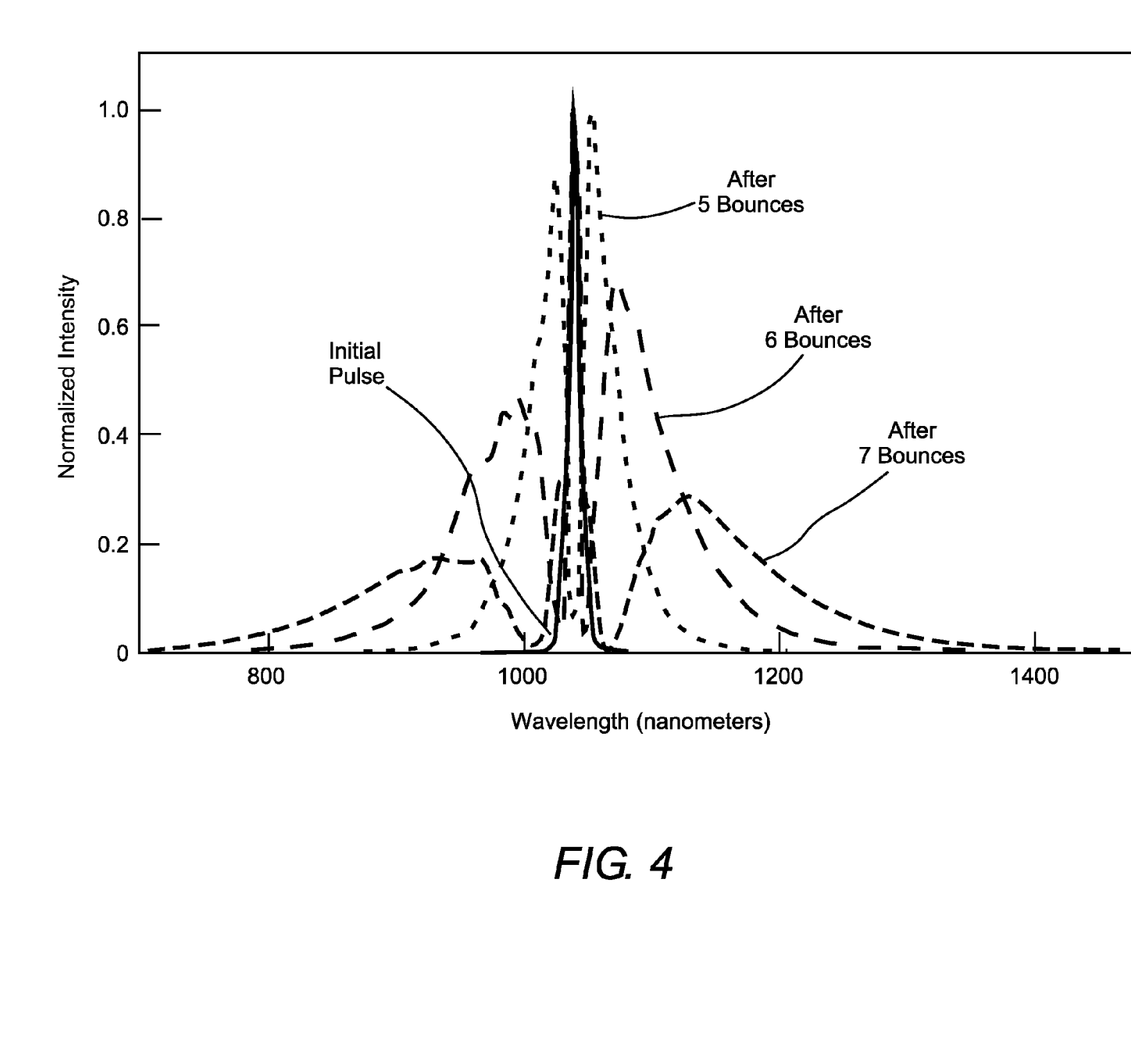
FIG. 4 is a graph schematically illustrating computed normalized intensity as a function of wavelength for an initial pulse, and for the initial pulse after 5, 6 and 7 passes in the super-continuum generator of FIG. 2.

FIG. 4 is a graph schematically illustrating computed normalized intensity as a function of wavelength for an initial pulse (solid curve), and the initial pulse after 5, 6 and 7 passes (dashed curves) in a super-continuum generator of FIG. 2. While some broadening will occur with just one bounce from (double pass through) broadening element 34, in practice, at least 2 bounces from (2×2 passes through) the broadening element will be required for broadening to be truly regarded as a continuum generation.

Figure 4A:
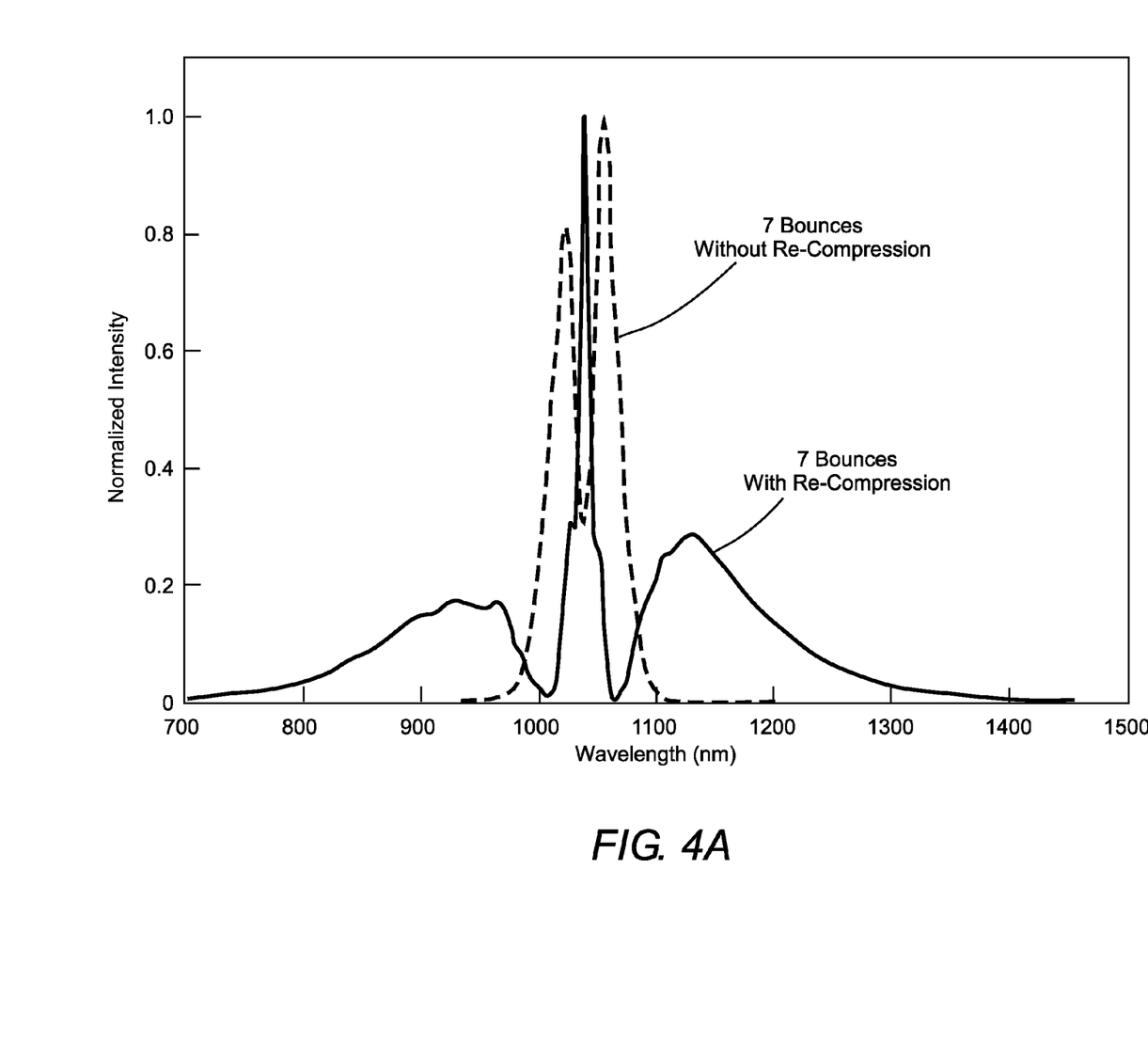
FIG. 4A is a graph schematically illustrating computed normalized intensity as a function of wavelength for the 7-pass curve of FIG. 4, with and without re-compression between passes.

FIG. 4A is a graph schematically illustrating computed normalized intensity as a function of wavelength for the 7-pass curve of FIG. 4 with (solid curve) and without (dashed curve) re-compression between bounces on the spectral-broadening element. It can be seen that the re-compression after each pass is particularly important in the spectral broadening process.

The amount of positive group delay dispersion (GDD) introduced by the broadening element on each bounce will be different, and, in fact, will decrease. Ideally, the negative GDD of minor 40 should be selected to exactly compensate GDD of the spectral-broadening element. However, with a fixed negative GDD used for recompression as depicted in FIG. 2, the negative GDD can be selected such that the net GDD is reduced to zero after the final bounce of any selected number of bounces. This will mean that the net GDD is positive for all prior bounces. In the computation of FIG. 4 it is assumed that the net GDD for each bounce is exactly zero. In a prism arrangement as depicted in FIG. 3, it may be possible to arrange the prisms such that the negative GDD sequentially decreases due to the different paths taken by a pulse through the prism on sequential passes. The spectral-broadening element in the computation of FIG. 4 is assumed to be a tellurium oxide ($TeO_2$) element having a thickness of 150 μm.

Figure 5:
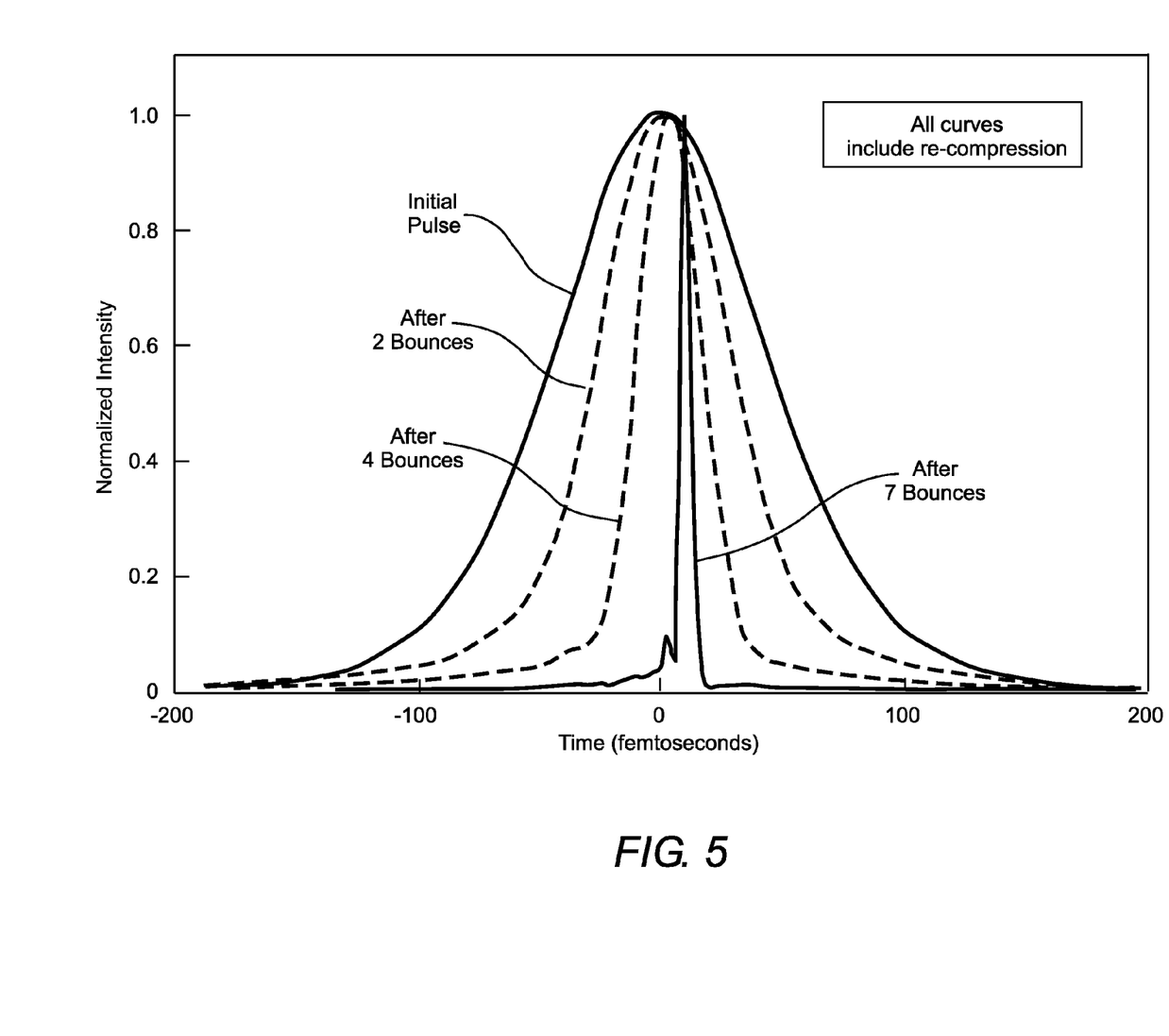
FIG. 5 is a graph schematically illustrating computed normalized intensity as a function of time for an initial pulse, and the initial pulse after 2, 4, and 7 passes in the super-continuum generator of FIG. 2.

FIG. 5 is a graph schematically illustrating computed normalized intensity as a function of time for an initial pulse, and the initial pulse after 2, 4, and 7 passes in the super-continuum generator of FIG. 2. It can be seen that the initial pulse has a FWHM duration of about 100 femtoseconds, and is compressed to an FWHM duration of less than 10 femtoseconds after the seventh pass through the super-continuum generator. In this calculation, the net GDD is exactly nulled after each bounce. As a result the pulse-duration becomes shorter and shorter on successive passes because of the increasing spectral bandwidth and optical coherence across the bandwidth.

In effect, the multi-pass relay arrangement of FIGS. 2 and 3 effectively increases the interaction length of a focused pulse in spectral-broadening element by twice the number of passes. So, effectively, in an element 34 having a thickness of 100 μm, and a pulse beam Rayleigh range of 100 μm, seven bounces in the broadening element are equivalent to an interaction length of 1.4 mm in a thicker element with the pulse-beam in focus over the entire 1.4 mm, without any requirement for filamentation to achieve this interaction length. In addition, the pulse duration stays short over the entire interaction length due to the pulse-compression between bounces.

It should be noted here that the multi-pass relay arrangement of FIGS. 2 and 3 is just one arrangement that can be used to provide multiple, focused double-passes of a pulse beam in a thin, bulk, spectral-broadening element. One such arrangement is contemplated which similar to the arrangements of FIG. 2, but wherein there is a single ellipsoidal minor, with the mirror-backed spectral-broadening element at one conjugate focus of the ellipsoidal mirror and the NGDD mirror at the other conjugate focus of the ellipsoidal mirror. This and any other multi-mirror arrangement for creating a predetermined number of interactions of a laser beam with an optical element may be used in the apparatus of FIG. 1 without departing from the spirit and scope of the present invention.

It should also be noted that while the present invention is described above with reference to broadening laser-radiation pulses from a fiber MOPA, ultra short pulses from any other type of laser or MOPA may be used without departing from the spirit and scope of the present invention. Such lasers and MOPAs include solid-state lasers and MOPAs, or hybrid MOPAs with a fiber-laser oscillator and solid-state amplification.

Figure 6:
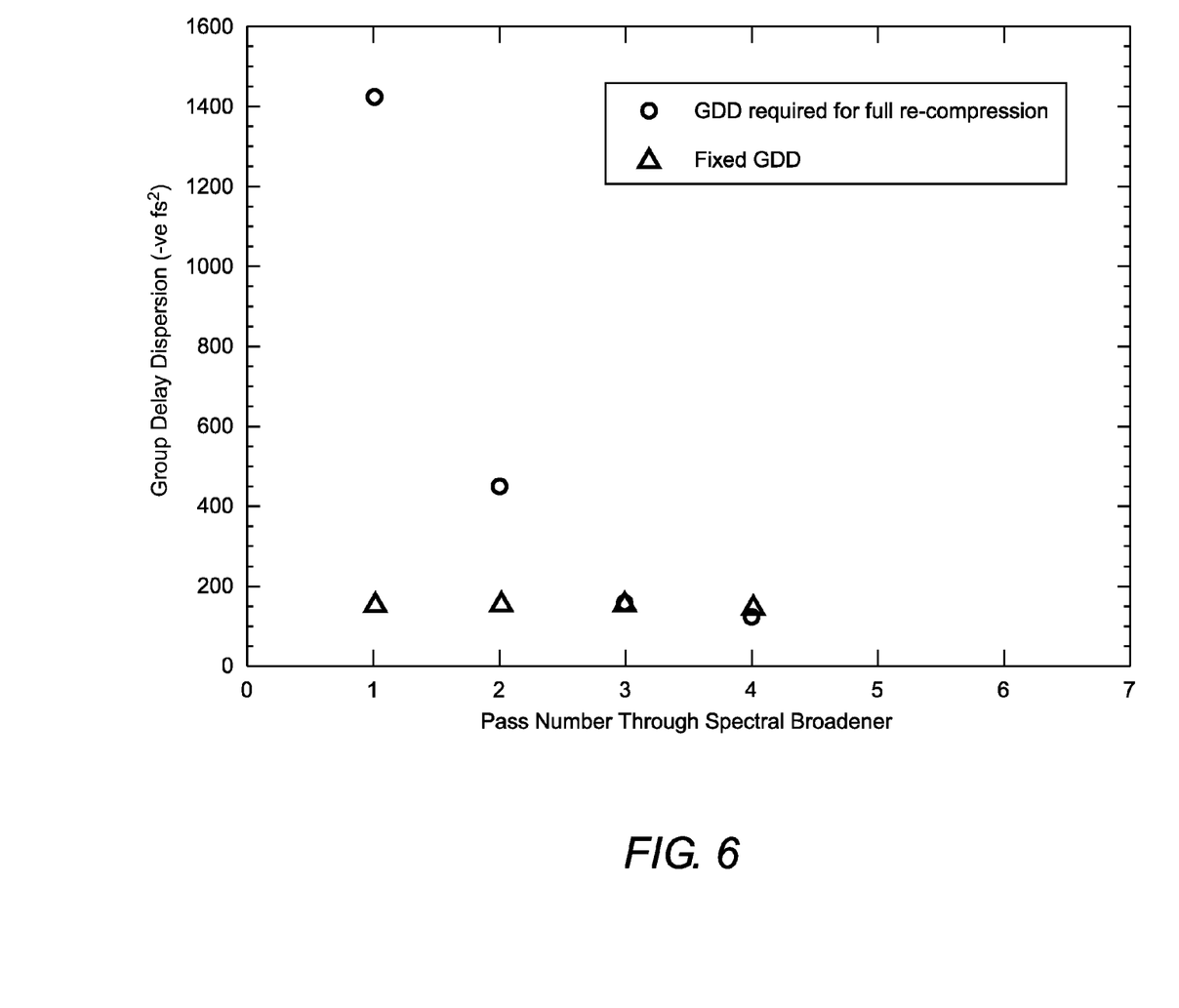
FIG. 6 is a plot schematically illustrating computed NGDD required after each pass in an example of the apparatus of FIG. 2 for full re-compression of a spectrally broadened pulse compared with a selected fixed NGDD.

As noted above after each pass through the inventive super-continuum generator, positive GDD deceases. This is illustrated in FIG. 6 which is a plot schematically illustrating computed NGDD (circles) required after each pass in an example of the apparatus of FIG. 2 for complete re-compression (exact nulling of net GDD in the apparatus). It can be seen that the NGDD required becomes almost asymptotic to some relatively low NGDD after 4 passes in the apparatus. This suggests that a fixed NGDD value (triangles) comparable to the asymptotic value may be selected. Here, the fixed NGDD value is selected to be equal to the value required for complete re-compression (net GDD nulling) after three passes. This is slightly greater than the value required for 4 or more passes.

In the calculation of FIG. 6 it is assumed that spectral-broadening element 34 of apparatus 20 is a ZnS element having as thickness of 300 μm. The initial pulse is assumed to be a pulse of 100 fs duration with an energy per pulse of 250 nJ. This is equivalent to an average power of 20 W at a PRF of 80 MHz. The beam diameter in the spectral-broadening element is assumed to be 40 μm.

Figure 7:
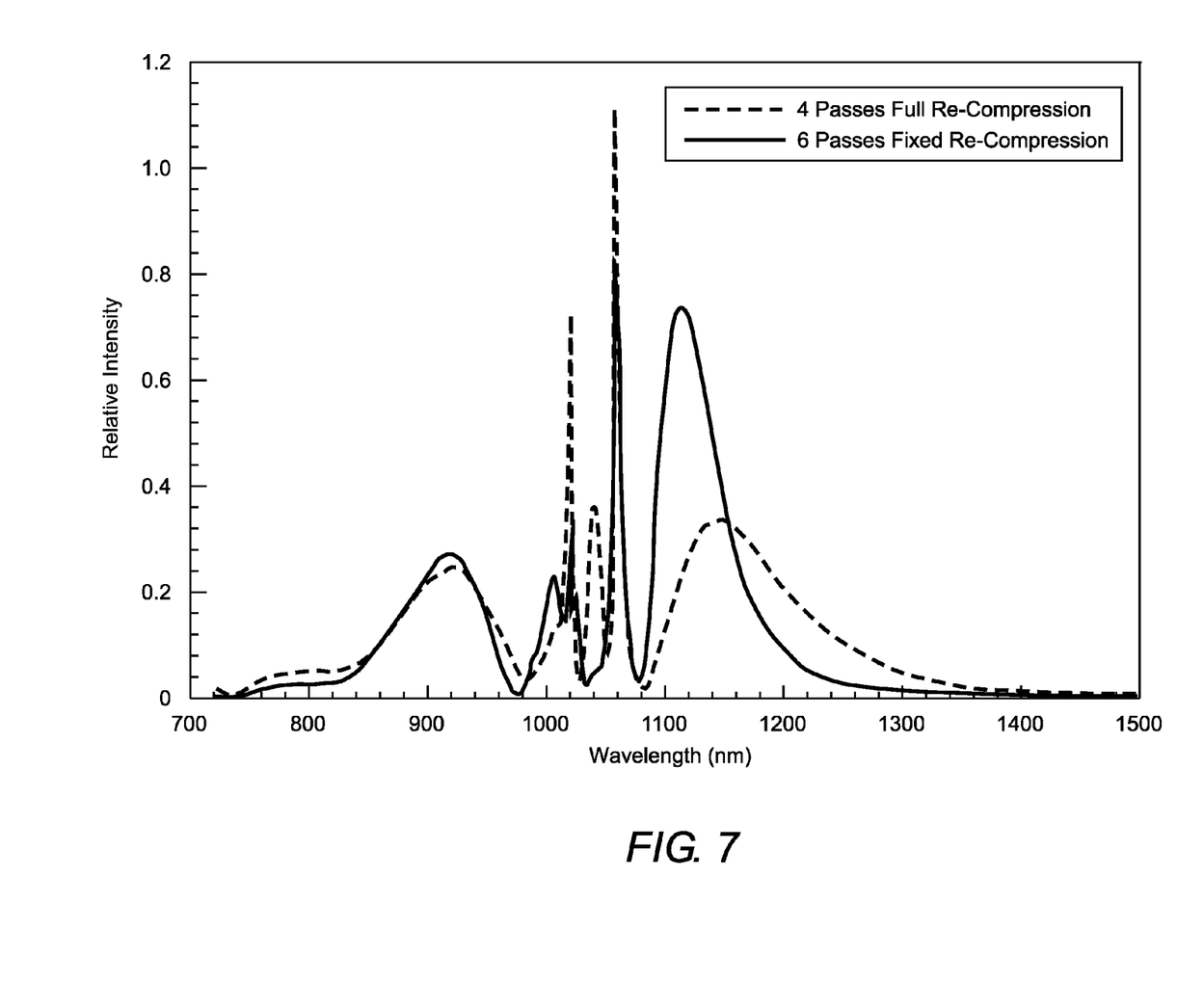
FIG. 7 is a graph schematically illustrating computed relative intensity as a function of wavelength the apparatus example of FIG. 6 for a pulse after 4 passes with complete re-compression on each pass, and after 6 passes with the same fixed re-compression after each pass.

FIG. 7 is a graph schematically illustrating computed relative intensity as a function of wavelength for the example of FIG. 6 for a pulse after 4 passes with complete re-compression on each pass, and after 6 passes with the same fixed re-compression (the fixed NGDD of FIG. 6) after each pass. It can be seen that the spectral width is about the same in each case with somewhat more asymmetry in the fixed NGDD case.

Figure 8:
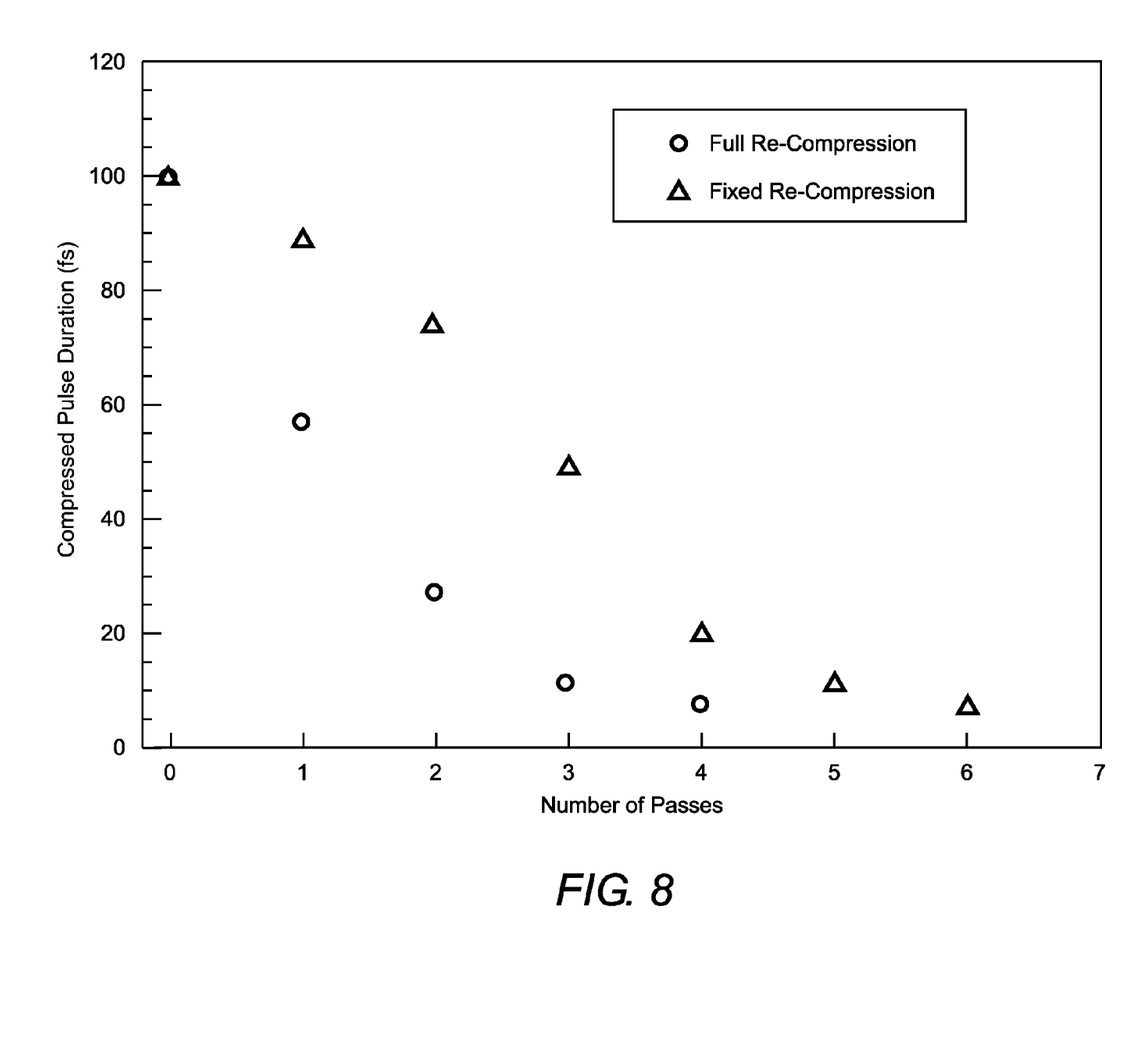
FIG. 8 is a plot schematically illustrating initial pulse-duration and pulse duration after each pass in the apparatus example of FIG. 6 for complete re-compression after each pass and for fixed re-compression after each pass.

FIG. 8 is a plot schematically illustrating initial pulse-duration and pulse duration after each pass in the apparatus example of FIG. 6 for complete re-compression after each pass and for fixed re-compression after each pass. It can be seen that the pulse-duration becomes progressively lower toward some asymptotic value less than 10 fs. In the case of complete re-compression on each pass, that value is reached after 4 passes. In the case of fixed re-compression on each pass, that value is reached after 6 passes.

In order to test the mathematical model used for all above-discussed calculations, some simple experiments were performed with pulses passed once (and focused in) a ZnS spectral-broadening element with net GDD nulled after the one pass. The pulses were provided by a fiber MOPA pre-compressed to about 370 fs before the pass through the ZnS element. The ZnS element had a thickness of 6 mm.

Figure 9A:
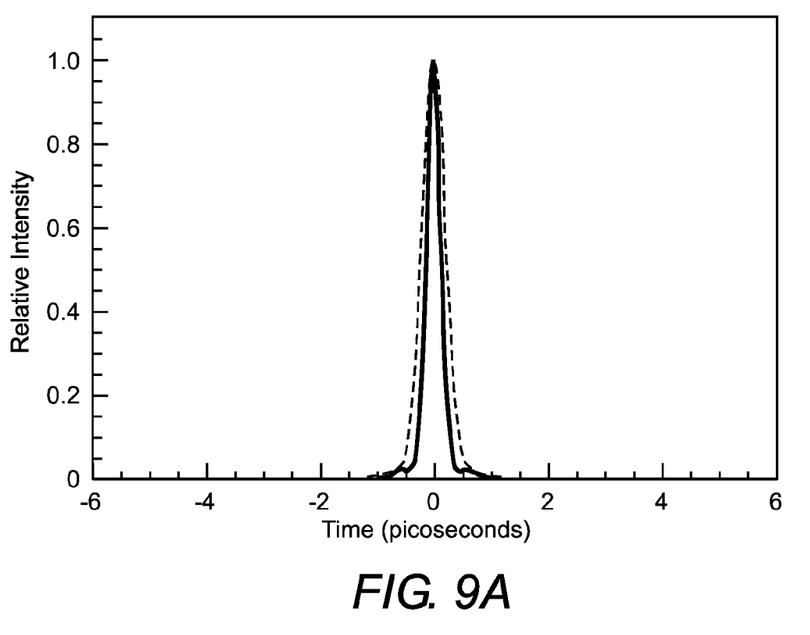
FIG. 9A is a graph schematically illustrating computed relative intensity as a function of time for an initial pulse and for the pulse after one pass through a zinc sulfide spectral-broadening element in a simple experimental one-pass broadening apparatus.
Figure 9B:
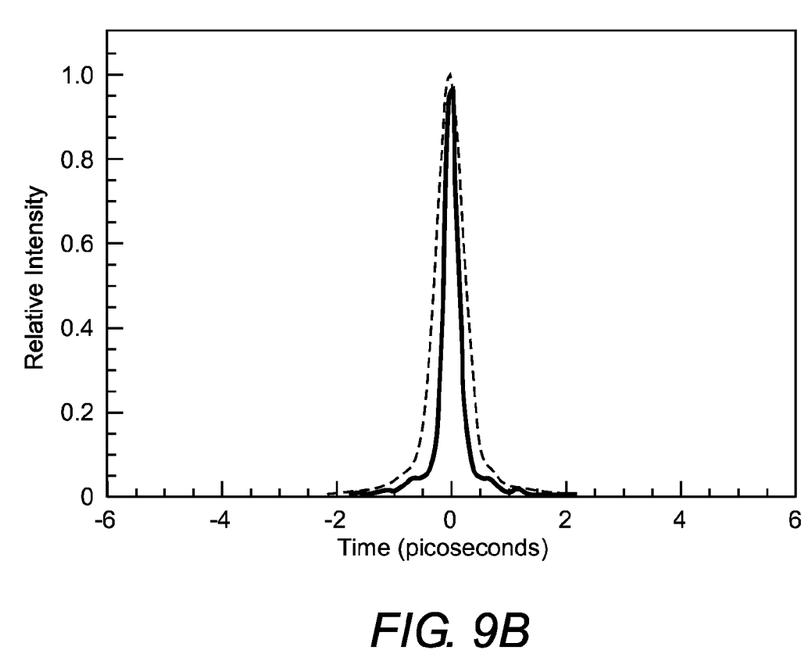
FIG. 9B is a graph schematically illustrating measured relative intensity as a function of time for an initial pulse and for the pulse after one pass through a zinc sulfide spectral-broadening element in the experimental one-pass broadening apparatus.

FIG. 9A and FIG. 9B are graphs schematically illustrating respectively computed and measured relative intensity as a function of time for an initial pulse, and for the pulse after one pass through a the zinc sulfide spectral-broadening element in the experimental one-pass broadening apparatus. It can be seen that there is very good correlation between the initial and reduced pulse durations. In each case the initial pulse duration was 370 fs with the duration being about 200 fs after the single pass.

Figure 10A:
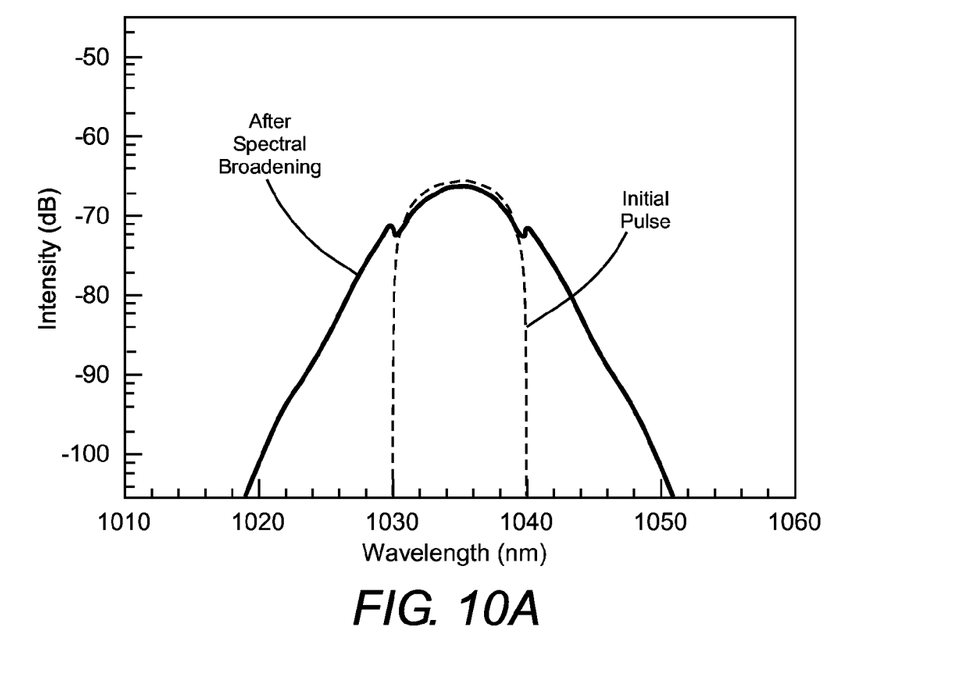
FIG. 10A is a graph schematically illustrating computed intensity in dB as a function of wavelength for an initial pulse and for the pulse after one pass through a zinc sulfide spectral-broadening element in the experimental one-pass broadening apparatus.
Figure 10B:
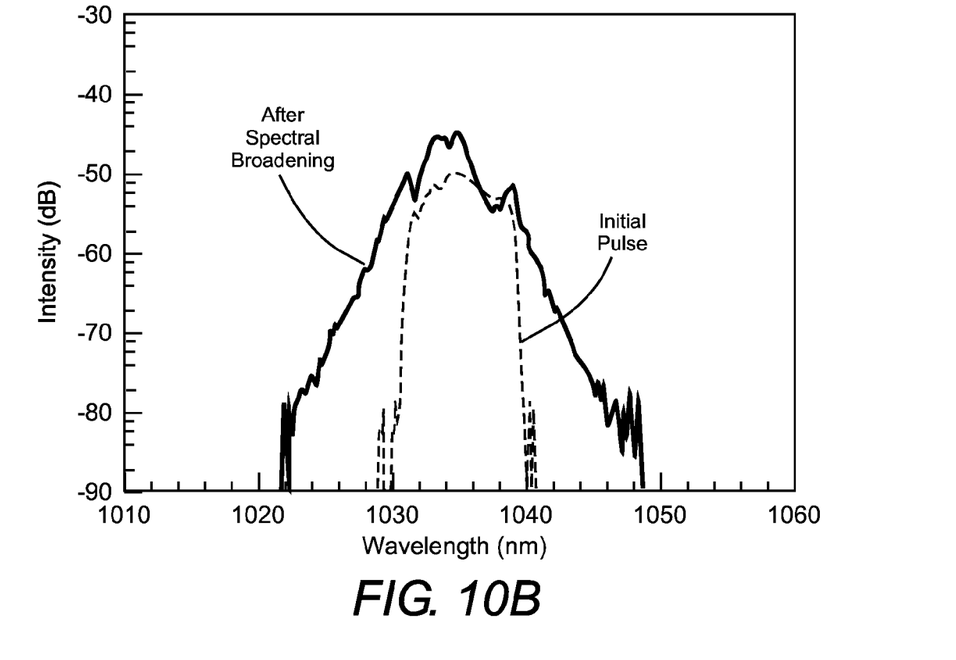
FIG. 10B is a graph schematically illustrating measured intensity in dB as a function of wavelength for an initial pulse and for the pulse after one pass through a zinc sulfide spectral-broadening element in the experimental one-pass broadening apparatus.

FIG. 10A and FIG. 10B are graphs schematically illustrating respectively computed and measured intensity in dB as a function of wavelength for an initial pulse, and for the pulse after one pass through a zinc sulfide spectral-broadening element in the experimental one-pass broadening apparatus. Here the correlation between computed and experimental data is not as good as in the case of the pulse duration examples with the spectral broadening being less in the experimental case. It is believed that this is due to the excessive thickness of the ZnS element which introduces a correspondingly excess positive dispersion and self-focusing effects. Nevertheless, the form of the measured, broadened spectrum, with side lobes beginning to develop around a central peak is similar to that of the computed spectrum.

In summary, the present invention is described above in terms of a preferred and other embodiments. The invention is not limited, however, to the embodiments described and depicted herein. Rather, the invention is limited only by the claims appended hereto.

What is claimed is:

1. Optical apparatus comprising:
 a source of pulses of laser radiation, each pulse having a first pulse-duration and a first pulse-spectrum; and
 a spectral broadener including a bulk spectral-broadening element and a negative group-delay dispersion device, the spectral broadener being configured and arranged to receive a pulse from the source of laser pulses, cause the pulse to make at least four interactions with the spectral-broadening element and at least two interactions with the negative group-delay dispersion (NGDD) device, and deliver the pulse with a second pulse-duration and a second pulse-spectrum, with the second pulse-spectrum being broader than the first pulse-spectrum and wherein the interactions of the pulse with the NGDD device are interspersed with the interactions of the pulse with the spectral broadening element in order to temporally recompress the pulse prior to the next interaction of the pulse with the spectral broadening element.

2. The apparatus of claim 1, wherein each interaction of the pulse with the spectral-broadening element includes a forward pass and a reverse pass of the pulse therein.

3. The apparatus of claim 2, wherein the pulse is focused in the spectral-broadening element in the forward and reverse passes of the interaction.

4. The apparatus of claim 1, wherein the negative dispersion device includes an NGDD mirror, and the interaction of the pulse with the NGDD device includes a reflection of the pulse from the NGDD mirror.

5. The apparatus of claim 1, wherein the NGDD device includes a prism pair, and the interaction of the pulse with the prism-pair includes a forward pass and a reverse pass of the pulse through the prism-pair.

6. The apparatus of claim 1, wherein the source of laser-pulses includes a pulsed laser-oscillator and at least one stage of optical amplification.

7. The apparatus of claim 6, wherein the laser-oscillator is a mode-locked fiber-laser laser.

8. The apparatus of claim 1, wherein the bulk spectral-broadening element is made from one of a group of nonlinear materials consisting of tellurium oxide, tellurite glass, sapphire, zinc sulfide, and silicon carbide.

9. The apparatus of claim 1, wherein the spectral broadener is in the form of an optical relay having first and second spaced-apart parabolic mirrors providing respectively first and second foci with first and second plane-mirrors at respectively the first and second foci.

10. The apparatus of claim 9, wherein the spectral-broadening element is located on the first plane-mirror and the interaction of the pulse with the spectral-broadening element includes a forward pass and a reverse pass of the pulse therein.

11. The apparatus of claim 10, wherein the second plane-mirror is an NGDD mirror functioning as the NGDD device and the interaction of the pulse with the NGDD device includes a reflection from the NGDD mirror.

12. The apparatus of claim 10, wherein the NGDD device is located between the second plane-mirror and the second parabolic mirror.

13. The apparatus of claim 10, wherein the NGDD device includes a prism pair and the interaction of the pulse with the NGDD device includes a forward pass and a reverse pass of the pulse through the prism-pair.

14. The apparatus of claim 1, wherein the spectral broadening device imposes group delay dispersion (GDD) on the pulse on each of the interactions of the pulse therewith and the NGDD value of the NGDD device is selected such that net GDD imposed on the pulse is about zero after the all of the interactions of the pulse with the spectral-broadening element and the NGDD device.

15. The apparatus of claim 1, wherein filamentation does not occur in the bulk spectral-broadening element as a result of any interaction of the pulse herewith.

16. The apparatus of claim 1 wherein the second pulse-duration is shorter than the first pulse-duration.

17. Optical apparatus comprising:
 a source of pulses of laser radiation, each pulse having a first pulse-duration and a first pulse-spectrum; and
 a spectral broadener including a bulk spectral-broadening element and a negative group-delay dispersion device, the spectral broadener being configured and arranged to receive a pulse from the source of laser pulses, cause the pulse to make at least four interactions with the spectral-broadening element and at least two interactions with the negative group-delay dispersion (NGDD) device, and deliver the pulse with a second pulse-duration and a second pulse-spectrum, the second pulse-spectrum being broader than the first pulse-spectrum and wherein the interactions of the pulse with the NGDD device are interspersed with the interactions of the pulse with the spectral broadening element in order to temporally recompress the pulse prior to the next interaction of the pulse with the spectral broadening element.

18. The apparatus of claim 17 wherein the second pulse-duration is shorter than the first pulse-duration.

* * * * *